United States Patent [19]

Giles

[11] Patent Number: 4,697,844

[45] Date of Patent: Oct. 6, 1987

[54] MEANS AND METHOD FOR REDUCING THE OPERATIVE HEIGHT OF THE FIFTH WHEEL OF A TRUCK TRACTOR

[75] Inventor: William L. Giles, Des Moines, Iowa

[73] Assignee: Ruan, Incorporated, Des Moines, Iowa

[21] Appl. No.: 749,658

[22] Filed: Jun. 28, 1985

[51] Int. Cl.$^4$ ............................................. B62D 53/08
[52] U.S. Cl. ..................................... 296/203; 296/25; 280/433
[58] Field of Search ............... 280/433, 438 R, 423 R, 280/400; 296/25, 203, 204

[56] References Cited

U.S. PATENT DOCUMENTS 2,918,302 12/1959 Hartenstine ..................... 280/423 R
3,580,611 5/1971 McNitt ................................ 280/433
3,802,716 4/1974 Wiers ............................... 280/423 R

FOREIGN PATENT DOCUMENTS 561860 4/1957 Italy ................................. 280/438 R Primary Examiner—John J. Love
Assistant Examiner—Donn McGiehan
Attorney, Agent, or Firm—Zarley, McKee, Thomte, Voorhees & Sease

[57] ABSTRACT

A means and method for reducing the operative height of the fifth wheel of a truck tractor as original equipment or by retroactively modifying a typical truck tractor frame. In retroactive modification an upper section of the framework supporting the fifth wheel is severed from the framework, the lower portion of this upper section is cut away and removed, and the upper section without the cut away portion is replaced on the original supporting framework. The upper section without the cut away portion is spliced to the fifth wheel framework by securing methods such as welding or securing apparatus. The securing apparatus can include an inner support which mateably fits interiorly between the upper section and fifth wheel framework to restore section modulus and strength. An outer securing support which includes a rigid plate can be secured between the upper section and fifth wheel framework. Additionally, support plates can be secured between the upper section and fifth wheel framework at spaced-apart positions along the splice line. The means and method of the invention thus serve to reduce the height of the fifth wheel on the truck tractor framework while insuring sufficient frame strength.

11 Claims, 7 Drawing Figures

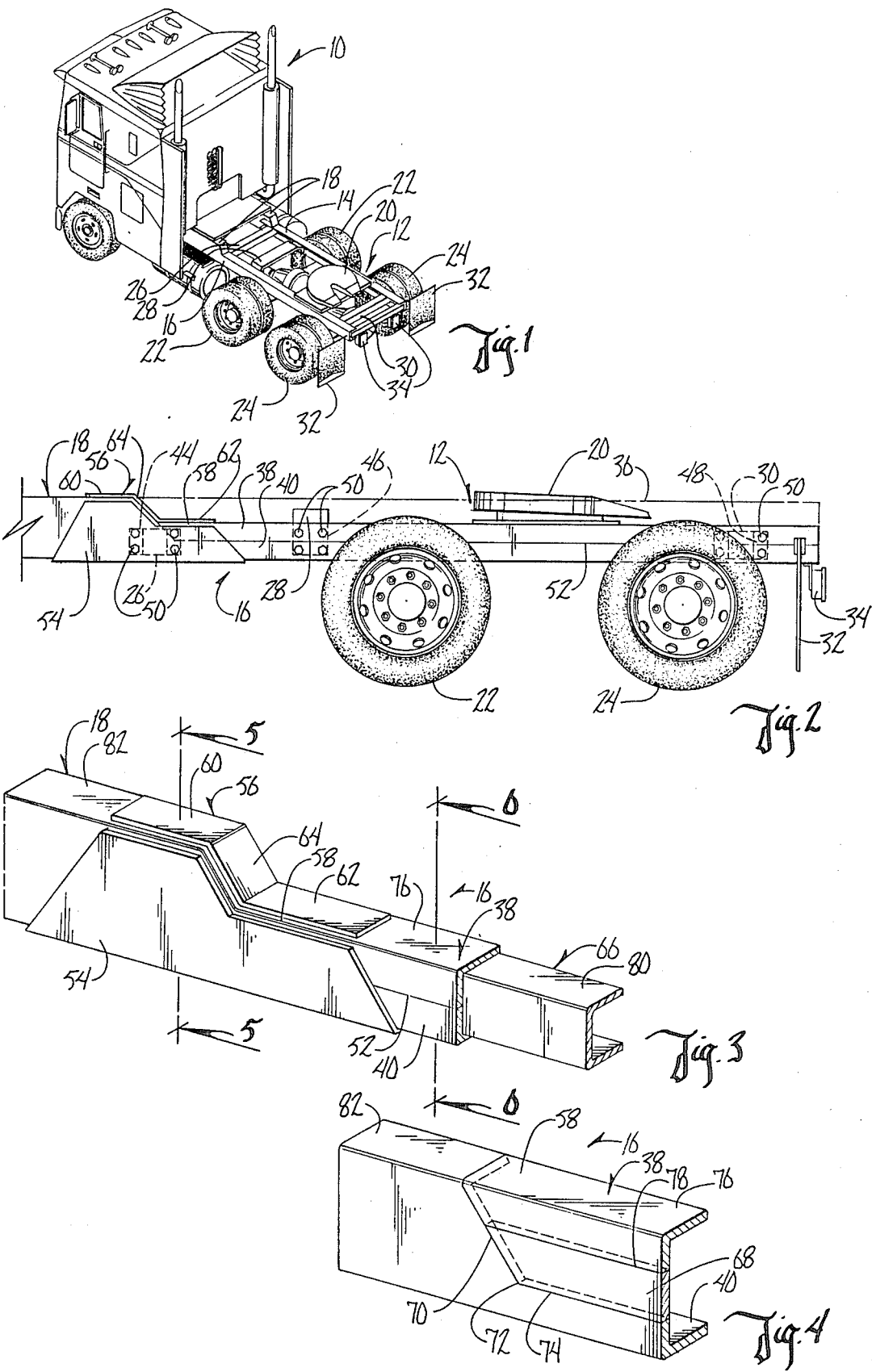

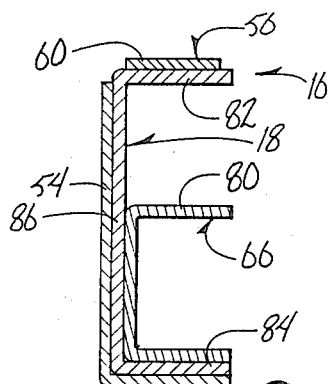
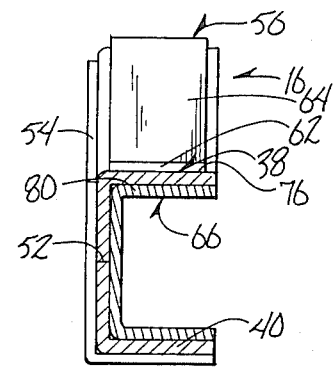
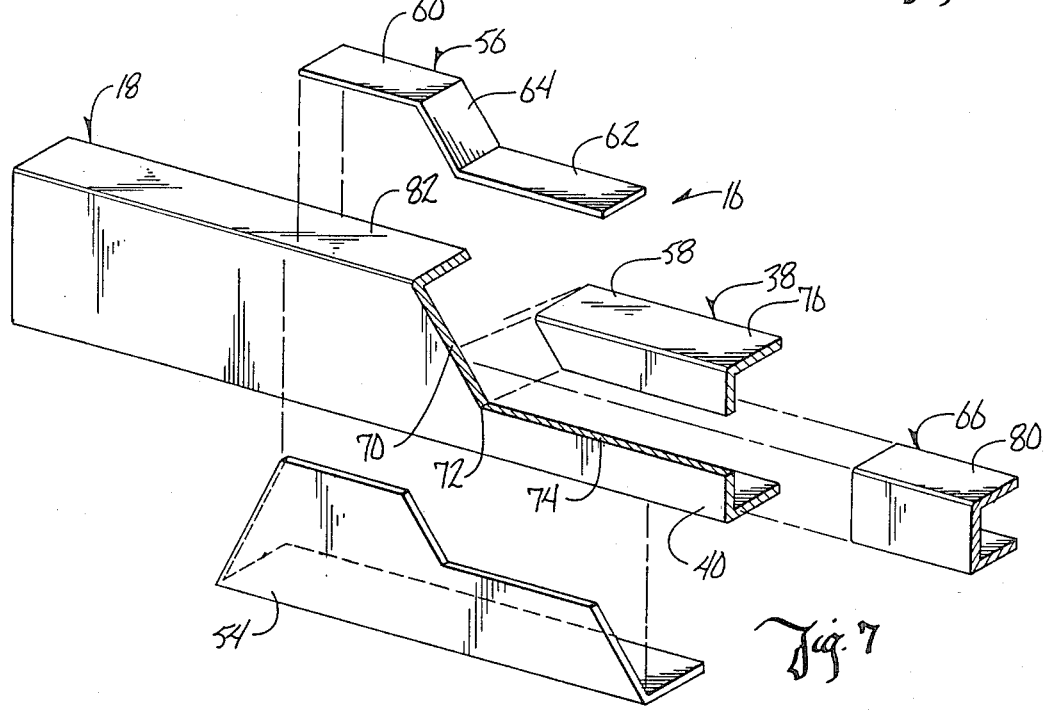

MEANS AND METHOD FOR REDUCING THE OPERATIVE HEIGHT OF THE FIFTH WHEEL OF A TRUCK TRACTOR

BACKGROUND OF THE INVENTION

A. Field of the Invention.

This invention relates to a means and method for reducing the operative height of the fifth wheel of a truck tractor, and more particularly, to a means and method for a fifth wheel supporting framework which reduces the effective operative height of the fifth wheel of a truck tractor.

B. Problems in the Art.

The conventional height of the fifth wheel of typical truck tractor/trailer combinations (sometimes called deck height) is essentially uniform throughout the industry. In many cases, the height of the floor of the tractor semi-trailer is thus determined by the height of the fifth wheel. While there are regulations limiting the overall vertical height of the tractor semi-trailer, there are generally only practical limitations, as primarily determined by the height of the fifth wheel, to limit the lower level of the floor of the tractor semi-trailer.

The present conventional height of the fifth wheel of typical truck tractors, determining the height of the floor of typical tractor semi-trailers, limits the distance between the roof and floor of the semi-trailer. The total available potential for payload volume is therefore not realized. Additionally, the conventional height of the tractor semi-trailer floor does not allow safe and easy loading and unloading or direct unloading from the ground, but rather requires loading/unloading docks or conveyor systems.

It would therefore be advantageous to lower the floor of tractor semi-trailers to gain these advantages. One way to do so is to reduce the effective operational height of the fifth wheel.

The fifth wheel on typical truck tractors is supported by a framework which is integral with the framework for the entire truck tractor. This framework must therefore be extremely strong to accomplish its dual function of serving as the frame for the truck tractor and as support for the fifth wheel which is therefore subject to substantial weight and substantial stresses and forces from the semi-trailer. Typical frames therefore are constructed of large "C" channel frames and cross members.

In order to accomplish a reduction of the operative height of the fifth wheel, a typical truck tractor frame would have to be built or modified to reduce its overall height, but at the same time maintaining at least the same stuctural rigidity and strength.

It is therefore a primary object of the invention to provide a means and method for reducing the operative height of the fifth wheel of a truck tractor which improves over or solves the problems and deficiencies in the art.

A further object of the invention is to provide a means and method for reducing the operative height of the fifth wheel of a truck tractor which retains the required structural rigidity and strength needed for the purposes and operation of truck tractor/trailer combinations.

Another object of the invention is to provide a means and method for reducing the operative height of the fifth wheel of a truck tractor which allows for a lower trailer floor to increase payload volume and for easier, safer loading and unloading.

A further object of the invention is to provide a means and method for reducing the operative height of the fifth wheel of a truck tractor which can either be accomplished in production of original equipment, or by retroactively modifying the frame of a typical truck tractor.

A further object of the invention is to provide a means and method for reducing the operative height of the fifth wheel of a truck tractor which provides a lower center of gravity for both the truck tractor and semi-trailer improving handling, stability, and safety.

Another object of the invention is to provide a means and method for reducing the operative height of the fifth wheel of a truck tractor allowing trailers which have a lower overall height which would lower wind resistance, improve energy efficiency and economy, and allow reduction in turbulance beneath the trailer reducing splash and spray to improve safety of the motoring public in general, and to improve handling, stability, and ride for the truck tractor/trailer combination.

Another object of the invention is to provide a means and method for reducing the operative height of the fifth wheel of a truck tractor which is economical and durable.

These and other objects, features and advantages of the invention will become apparent with reference to the accompanying drawings and description.

SUMMARY OF THE INVENTION

The present invention is a means and method for reducing the operative height of a fifth wheel on a typical truck tractor. For original equipment, the means and method utilizes a fifth wheel supporting framework which is reduced-in-height from the remaining truck tractor framework to provide a lower mounting support for the fifth wheel. The reduced-in-height fifth wheel supporting framework may or may not include added support means to insure required framework strength and rigidity in association with the remaining truck tractor frame.

The method for retroactively modifying a typical truck tractor frame utilizes four basic steps to accomplish this purpose. First, each part of the typical original truck tractor frame which supports the fifth wheel has an upper section severed from it. Secondly, a lower portion of each severed upper section is then cut away which reduces the height of each upper section. Third, each upper section, having the lower portion cut away and removed, is then replaced upon the fifth wheel supporting framework. Fourth, each reduced-in-height upper section is spliced and secured (by welding or otherwise) to the original framework to insure sufficient strength and rigidity of the framework for its intended use.

The means of the invention, being a product of the process of the method for retroactively modifying a typical truck tractor frame, utilizes the modified conventional frame in the same manner as described in the method and further incorporates specific structure to accomplish the splicing and securing of each upper section, without the cut away portion, to the fifth wheel supporting framework. An inner support means is sized to mateably be positioned in between and inside each reduced-in-size upper section and the fifth wheel supporting framework. This inner support means works to both assist in splicing the two frame pieces together and to re-establish required strength (section modulus) and rigidity which was lost in severing the two pieces. An outer support means can also be utilized which primarily serves to secure the front end of the upper section to the framework, and further assists in establishing required strength and rigidity along the framework. It can be seen that conventional cross members complete the framework of the truck tractor.

The resulting fifth wheel supporting frame, as created by the methods or utilized by the means of the invention, allows a lower fifth wheel so that a lower floored trailer can be used. At the same time the invention maintains the desired strength and rigidity of the framework, which is required.

BRIEF DESCRIPTION OF THE DRAWINGS

FIG. 1 is a perspective view of a truck tractor in accordance with the invention.

FIG. 2 is a side elevational view of a fifth wheel supporting framework of a typical truck tractor which has been retroactively modified according to the invention.

FIG. 3 is a partial perspective view of the forward end of the fifth wheel supporting framework of FIG. 2, with certain parts sectioned.

FIG. 4 is a partial perspective view of a conventional fifth wheel supporting framework of a conventional tractor truck, showing how the upper section of the conventional fifth wheel supporting framework is severed and the line along which the lower portion of the upper section is cut away from the upper section.

FIG. 5 is a sectional view taken along lines 5—5 of FIG. 3.

FIG. 6 is a sectional view taken along line 6—6 of FIG. 3.

FIG. 7 is an exploded view of FIG. 3.

DETAILED DESCRIPTION OF THE PREFERRED EMBODIMENT

In reference to the drawings, and particularly FIG. 1, there is shown a tractor truck 10 in accordance with the invention. Tractor truck 10 is conventional in all respects, except for its fifth wheel supporting framework, designated generally by reference numeral 12, and desired modifications in the size and configuration of the tandem wheels, tires, and brakes.

Fifth wheel supporting framework 12 includes parallel frame rail members 14 and 16 which are integrated with the forward truck tractor frame 18 and extend rearwardly therefrom. Fifth wheel 20 is mounted to the top of parallel frame rail members 14 and 16 between tandem wheel pairs 22 and 24. Cross members 26, 28 and 30 extend between parallel frame rail members 14 and 16 at spaced apart locations.

It should be noted that fifth wheel supporting framework 12 is reduced-in-height from the forward truck tractor frame 18 to present a lower mounting support for fifth wheel 20, which in turn allows a lower floor height for semi-trailers (not shown) used with truck tractor 10.

It is to be understood that the suspension and drive train components of the truck tractor for tandem wheel pairs 22 and 24 are conventionally connected to parallel frame rail members 14 and 16, as is known in the art. Likewise is the case for mud flaps 32 and tail lights 34, and any other accessory equipment or structure.

FIGS. 2-7 relate to fifth wheel supporting framework 12 as retroactively modified from a conventional fifth wheel supporting framework of a typical truck tractor.

FIG. 2 depicts the difference between a conventional fifth wheel supporting framework (shown in ghost lines and referred to by reference numeral 36), and the fifth wheel supporting framework 12 of the invention. Parallel frame rail members 14 and 16 are reduced-in-height from the conventional framework (see ghost lines 36) by severing an upper section 38 from each, removing a lower portion 68 of each severed section 38, and then replacing each severed section 38, without the removed portion 68, to the framework 40.

It is to be understood that original parallel frame rail members 14 and 16 are not completely severed, but rather only upper section 38 is removed and then replaced after being reduced-in-size. The integrity of parallel frame rail members 14 and 16 is therefore never completely severed.

Reduced-in-size upper section 38 is mateably secured to lower section 40, which is integral with the forward tractor truck frame 18 in general. In the preferred embodiment, cross members 26, 28, and 30 are secured to parallel frame rail members 14 and 16 by support plates 44, 46 and 48, respectively. Bolts 50 are used to attach support plates 44, 46 and 48 to frame members 14 and 16.

FIG. 2 also shows outer support plate 54 and top support plate 56, which cooperate to add securing and rigidity support to the part of fifth wheel supporting framework 12 directly surrounding front end 58 of upper section 38. Support plates 54 and 56 can be secured in place by welding or other means known within the art.

As can be seen in FIG. 2, the reduction in vertical height accomplished by the invention creates a height differential between the tops of parallel frame rail members 14 and 16 and the forward truck tractor frame 18 at front ends 58 of upper section 38. For this reason, top support 56 has a front section 60 attached to the top of forward truck tractor frame 18, a rear section 62 attached to the top of upper section 38, and a slanting middle section 64 between front and rear sections 60 and 62 which covers the gap created by the height differential. Outer support plate 54 is configured to follow the shape of top support plate 56 so that there can be a uniform structural appearance and so that no parts extend outwardly which might interfere with a trailer when turning corners and the like.

FIG. 3 shows in detail what parallel frame rail members 14 and 16 look like when assembled. Outer support plate 54 and top support plate 56 essentially wrap around the junction between front end 58 of upper section 38 and the forward truck tractor frame 18 which has not been reduced-in-size. It further should be understood that in the preferred embodiment, upper section 38 is welded to lower section 40 of fifth wheel supporting framework 12 along splice line 52.

An additional structural supporting member is shown in FIG. 3. An inner support member 66 is positioned and secured within the interior space between upper section 38 and lower section 40. Inner support 66 is configured to be like a liner or sleeve so that it matingly abuts the interior surfaces of upper and lower sections 38 and 40, both to secure those sections together and to provide strength and support (section modulus) which was diminished by the severance of upper section 38 from lower section 40 of supporting framework 12.

FIG. 4 shows the manner in which upper section 38 is initially severed along splice line 52 from conventional fifth wheel framework 42 and depicts the lower portion 68 which will be cut away along line 78, removed, and then not used when upper section 38 is spliced back into fifth wheel framework 12. In the preferred embodiment, the forward end 58 of upper section 38 is formed by cutting an oblique angle slanting rearwardly (reference numeral 70) and downwardly a desired distance (reference numeral 72). A cut (reference numeral 74) is then made parallel to top surface 76 of upper section 38. In the preferred embodiment cut 74 extends all the way to the rear end of parallel frame members 14 and 16.

This severed upper section 38 is then removed and a cut (reference numeral 78) is made, again parallel to top surface 76 of upper section 38, along the entire length of upper section 38 to remove cut away lower portion 68.

Typical truck tractors usually utilize fifth wheel framework which has a vertical height of ten inches. It is preferred, in the present invention, that upper section 38, when originally severed along lines 70 and 74 should remove seven inches of vertical height from the conventional fifth wheel framework. The cut along line 78 to remove lower portion 68 is three inches below top surface 76 of upper section 38, so that the resulting spliced together parallel frame rail members 14 and 16 are six inches tall, thereby decreasing the overall height of fifth wheel 20 by four inches.

FIG. 5 shows, in section, the support given to parallel frame rail members 14 and 16, at the point just forward of the junction of front end 58 of upper section 38 with the forward truck conventional tractor frame 18. Because top wall 80 of inner support 66 does not abut the top wall 82 of forward truck tractor frame 18, the additional support of outer support plate 54 and top support 56 is utilized to insure strength and rigidity in the framework.

FIG. 6, in comparison, shows in section the matable supporting function of inner support 66, which essentially restores the strength and rigidity (section modulus) of the fifth wheel supporting framework by essentially forming a supporting sleeve within spliced together upper section 38 and lower section 40 of fifth wheel supporting framework 12.

FIGS. 5 and 6 show that conventionally, the fifth wheel supporting framework 12 of a truck tractor is C-shaped in-cross-section (C-channels). The C-shaped-in-cross-section front truck tractor frame 18 consists of a top flange (top wall 82), a lower flange 84 and a sidewall or web 86 interconnecting flanges 82 and 84. Splice line 52 passes through top flange or top wall 82 and then into and along web 86 to sever each upper section 38 from the framework (see FIG. 4). After lower portion 68 is cut away, and upper section 38 is replaced and spliced to its corresponding lower section 48 of the fifth wheel supporting framework 12, the C-shape-in-cross-section is retained. Thus, the supporting members used to re-establish strength and rigidity after severance of upper section 38 correspond to that C-shape-cross-section. It is to be understood, however, that other fifth wheel supporting framework shapes may exist which can likewise be modified in a similar manner according to the invention.

FIG. 7, with comparison to FIG. 3, further assists in understanding the invention showing, by exploded view, the cooperation of the various elements of the fifth wheel supporting framework 12 as they would fit together after severance of upper section 38 and removal of cut away portion 68 in preparation to be assembled in final form.

It is to be understood that the length of upper section(s) 38 is to be coordinated with the swing radius required by the trailer to be used. In the preferred embodiment upper section 38 is approximately 64" long. Conventional trailers have an interior height of 110". Lowering the fifth wheel, even by a few inches, achieves a valuable increase in payload volume. The additional height also allows previously unachieveable double-stacking of certain sized containers.

It is to be understood that the invention can also be made as original equipment for truck tractors 10. Parallel frame rail members 14 and 16 would be single unitary pieces integral with, but smaller-in-height than corresponding forward truck tractor frame 18, as can be seen in FIG. 1. Many different manners and methods are known within the art for manufacturing parallel frame rail members 14 and 16 as original equipment according to the invention. In the preferred embodiment, original equipment parallel frame rail members 14 and 16 would be C-shaped in a cross-section or "C" channel frames. Added support members or means such as inner support 66, outer support plate 54, and top support plate 56 may or may not be used, according to need and choice.

It will be appreciated that the present invention can take many forms and embodiments. The included preferred embodiment is given by way of example only, and not by way of limitation to the invention, which is solely described by the claims herein. Variations obvious to one skilled in the art will be included within the invention defined by the claims.

What is claimed is:

1. A truck tractor fifth wheel framework for reducing the operative height of the fifth wheel of the truck tractor from its original conventional fifth wheel supporting height comprising:

a pair of spaced apart, generally parallel frame rail members each having horizontally disposed top and bottom walls connected by at least one vertical side wall, said top, bottom and side walls defining a rail channel, said top walls defining the orignal, conventional fifth wheel supporting height;

each said frame rail member having along its length a fifth wheel supporting portion with a top wall being lower in height than the top wall of any other portion of said frame rail member so that said fifth wheel of said truck tractor is mountable upon said top wall of said fifth wheel supporting portion at a reduced height from said conventional fifth wheel supporting height, said bottom wall of said fifth wheel supporting member portion being integral with and at the same height as the bottom wall of any other portion of said frame rail member;

said fifth wheel supporting portion being formed by a lower rail section and an upper rail section, the upper rail section including the top wall and a part of the side wall of the fifth wheel supporting portion severed along a splice line from said fifth wheel framework and having had a lower part of said side wall cut away and removed, said upper section being replaced upon and spliced to the lower rail portion without the lower part of the side wall which has been cut away and removed, thereby lowering the operative height of the fifth wheel from the conventional fifth wheel supporting height;

interconnecting cross support means between said frame rail members; and support means operatively incorporated with said fifth wheel supporting portion to increase strength and rigidity of said fifth wheel supporting portion of said frame rail member.

2. The apparatus of claim 1 wherein said support means comprises inner support means positioned within each said rail channel to strengthen and assist in securing said upper section to said lower section of said frame rail member at least along said splice line.

3. The apparatus of claim 2 wherein each said inner support means is a C-shaped channel beam having upper, lower and side walls corresponding to said top, bottom and side walls of each said frame rail member, said inner support means matingly fitting within said rail channel of said frame rail member so that each corresponding side of said inner support means abuts, strengthens and supports said corresponding sides of said frame rail member.

4. The apparatus of claim 3 wherein each said outer support means further comprises a top plate which has a rear portion attached to the top wall of said upper section, a front portion secured to said frame rail member, and a middle section crossing said splice line through said top wall of said frame rail member.

5. The apparatus of claim 1 wherein said support means comprises outer support means positioned on the exterior of each said frame rail members assisting in securing said upper section to the lower section of said frame rail member at least along said splice line.

6. The apparatus of claim 5 wherein each said outer support means comprises an L-shaped plate having a bottom wall which is secured to said bottom wall of said frame rail member and a side wall which is secured to said side wall of said frame rail member across said splice line.

7. The apparatus of claim 7 wherein said support means comprises inner and outer support means at least along said splice line.

8. The apparatus of claim 1 wherein said support means further comprises a plurality of support plates assisting in securing each said upper section to its corresponding said lower section of said frame rail members at least across said splice line.

9. The apparatus of claim 1 wherein each said frame rail member comprises a C-shaped channel beam having parallel, spaced apart horizontal said top and bottom walls with the vertical side wall connecting adjacent edges of the top and bottom walls defining the rail channel.

10. The apparatus of claim 1 wherein each said upper section and its corresponding bottom section of said frame rail member are secured to one another by welding along said splice line.

11. A framework for supporting a fifth wheel of a truck tractor comprising:
left and right parallel frame rail members each having an upper and a lower section, said upper sections being independent from said lower sections and supporting mounting means for said fifth wheel of said truck tractor, and lower sections being integral with said frame rail members, said upper and lower sections defining a channel therebetween and being separated by a splice line;

an outer support means comprising at least one support plate secured betwen said upper and lower sections across said splice line;

an inner support means positioned and secured in said channel between said upper and lower sections; and cross beams extending laterally between said parallel frame rail members and having support plates on their opposite ends being securable between said upper and lower sections across said splice line.

* * * * *